March 9, 1943.   A. C. FISCHER   2,313,057
SEED PLANTING, SEED INOCULATION, AND FERTILIZER
Original Filed March 21, 1935
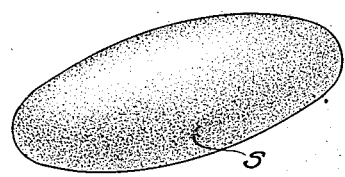
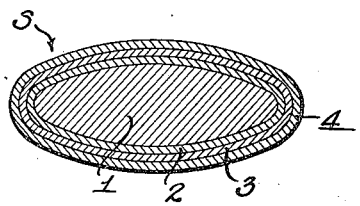
Inventor
ALBERT C. FISCHER
By Knight Bros.
Attorney Patented Mar. 9, 1943

2,313,057

UNITED STATES PATENT OFFICE 2,313,057

SEED PLANTING, SEED INOCULATION, AND FERTILIZER

Albert C. Fischer, Chicago, Ill.

Original application March 21, 1935, Serial No. 12,245. Divided and this application August 4, 1939, Serial No. 288,428

3 Claims. (Cl. 47—1)

This invention relates to an improvement in seed planting and inoculation.

This application is a division of my application Ser. No. 12,245, filed March 21, 1935, for "Seed planting, seed inoculation and fertilizer," which has matured into Patent No. 2,168,332, August 8, 1939.

Certain seeds in order to be prolific in their growth require the ground to be inoculated with bacteria, particularly such seeds and legumes as alfalfa, clover, lespedeza, soy beans, cowpeas, lima beans and others, which require inoculation with nitrogen fixing bacteria, or likewise other plants, such as nonlegumes, to which other bacteria might be adapted more readily than nitrogen fixing bacteria. My invention would work satisfactorily in either case. On the other hand while some seeds may require inoculation, it will be advantageous for other seeds to be surrounded with proper fertilizer, insecticide and other materials suitable for the satisfactory growth of the plant. Information has been disclosed in which various types of glue have been made into a very thin coating, the seed immersed therein and bacteria then adhered to this coating.

My purpose is to coat the large seeds with a colloid substance and mixing with the colloid substance suitable bacteria and preserving said coating in a moist state so that it will not become entirely dry, thus providing a culture so to speak on the seed. Where a fertilizer and insecticide are used this material may be coated with a satisfactory colloid and then may be later dried or provided in a moist state as desired. I expect to accomplish this in two or three ways, first by coating the larger seed with a substantial body of a colloid and incorporating therein these substances, second by making droplets of the colloid matter in which the seed is embedded, and third, by creating flakes in which the seed is embedded, my object being that where the seed is coated with a substantial layer of colloid the bacteria, or fertilizer or insecticide may be readily mixed therein. Where fertilizer and chemicals, lime or other suitable material are utilized the coating of the flakes or the droplets may be completely dried. However, a reversible colloid should be used so that it can readily be rewetted and the colloid material be brought back to a moistened state, and in the case of the use of bacteria it is advisable to preserve the culture or colloid in a moist state. This colloid is preferably non-adhesive in nature insofar as outside contact is concerned.

Where the droplets are used the fertilizer may be held away from the seed by first coating the seed with a colloid substance that has anything of this material embedded therein, and then again coated with another layer which has the fertilizer therein. In other words, in order to keep the seed from being destroyed it might be advisable to first coat the seed with a colloid which has nothing in it except the various ingredients; then the colloid may be dried, if desired, and another surface coating may be placed thereon in which the fertilizer, insecticide, etc., may be incorporated in the colloid. Thus, I protect the seed from any detrimental influence of either fertilizer or any chemical which may be desirable to mix therein. As a last resort it might be advisable to coat with a bacteria coating about the time of planting. In this manner I furnish to the seed all available requirements which may be necessary for its proper growth. On the other hand I may embed a seed in a flat, flake like piece of colloid and may depend upon edging the same with a fertilizer and an interior ring of insecticide, the seed remaining in the center. In other words, I may form a flake material in which part of the flake is free of fertilizer or insecticide, another portion containing fertilizer or insecticide and still another portion remaining free of insecticide or fertilizer, adapted as a culture for bacteria.

By controlling the manufacture of these flakes the colloid may be dried about the seed and later rejuvenated by wetting, when it would start to function. The purpose of this is to prevent any deterioration of the seed due to any of the heat or chemical substances which may be contained in the colloid substance, which may necessitate the colloid being poured in layers or in rings or may require the deposit of the fertilizer or various chemicals in various deposits about the seed in order to prevent the material reaching the seed itself, this depending upon whether it would be detrimental or of advantage. Where the chemical, fertilizer or insecticide is not harmful to the seed, there is no reason why it could not be mixed with the colloid and the colloid in turn dried upon the seed. On the other hand where bacteria are involved, and where life must be preserved, it might be advisable to mix the bacteria with the colloid and preserve the colloid in a moist state, which could readily be done by the addition of a slight quantity of glycerine.

My invention relates to treatment of very small fine seeds, difficult to handle and control, and to preserving about the seed a moist condition even though the soil about it may dry out, depending more or less upon the colloid body to bring this about.

It may be readily understood that plant foods, mulch material, such as peat moss, straw and like substances, may be utilized and treated in the same way, either with or without the chemicals, fertilizer or bacteria, and that any combination or group of combinations may be utilized as outlined.

One object of my invention is to give the seed an individual treatment rather than a mass treatment, such as often described in agricultural publications, and is extended to flower seeds, in fact to any type of seeds whatever, depending upon the special treatment of each seed, the requirements to get properly started and whether it requires bacteria or not to provide the soil with substances which are not inherent therein. I wish to distinguish between simply preparing the seed in a sticky state in which bacteria is made to adhere, and preparing it with a substantial body portion in which the bacteria is self contained or in which the bacteria may feed in the shape of a culture. My purpose would be to adapt certain colloids for this purpose in creating jells, which would be beneficial to the seed and in no manner destroy, burn or injure the seed by reason of the chemical reaching it, except at the proper time.

My invention relates to controlling the complete drying out of the colloid, the time element when used in conjunction with bacteria, and this control may be entirely eliminated where the chemicals involved do not affect the preservation of actual life in the shape of bacteria. I prefer the use of a reversible colloid.

Likewise I may preserve this bacteria in capsule form, in which the capsule is dried and contains fertilizing material and in which the bacteria is housed about the seed in a capsule.

The colloid matter may be any suitable colloid, such as gelatine, agar agar, jells secured from seaweed, plant seed, animal and vegetable glues, and may be utilized in a dry state or in a continued moist state. The bacteria or other material may be incorporated while in this state and the seed immersed therein and the entire mass dried until ready for use or kept in a state which would act as a culture for the bacteria, or may be so provided that a rewetting and warming up of the matter surrounding the seed will bring renewed life and vigor to the plant.

I wish to distinguish from the ordinary process of coating with a very thin sticky substance and allowing the bacteria to stick thereto at the time of planting. My idea is rather to create a housing substance for the bacteria and this process, of course, would be distinct from a fertilizing, chemical treatment or otherwise providing for the seed. The colloids, of course, are mixed with water or other materials to thin them out into a liquid solution and may be again dried out, and by adding various substances, such as, glycerine and other chemicals, the drying out may be delayed.

My invention relates primarily to the seed being furnished these materials in successive stages in its devolpment, as distinguished from merely coating the seed at the time of planting and having bacteria adhered to it. In the use of certain chemicals the phases involving bacteria do not enter into the coating of the seed and in many cases having chemicals in the coating it will be dried out and the seed planted, allowing the weather conditions to bring about the reversible condition of the colloid and the effectiveness of the seed.

The colloid or binder material may consist of any suitable colloid prepared by adding water thereto in a warm condition until the consistency of jell desired is secured, at which time additions may be made thereto in the shape of inoculating bacteria, fertilizer, insecticide, mulch materials, chemicals, etc.

My invention, therefore, consists of a plan of inoculating seed with bacteria, a plan of providing seed with chemicals immediately adjacent thereto when coated, a plan whereby seed may be coated with a colloid substance containing fertilizer material, a plan by which seed may be coated with a material containing mulching material, a plan by which any of these materials in combination may be held away from the seed in successive stages in its growth, a plan of preserving moisture about the seed through a colloid film, a plan of furnishing an insecticide about the seed at the same time providing it with plant food or bacteria.

One specific embodiment of the invention is illustrated in the accompanying drawing, wherein Fig. 1 is a perspective view of a seed in accordance with the present invention on an enlarged scale, and Fig. 2 is a vertical sectional view showing the several shells surrounding the seed body.

In the drawing is shown the coated seed S which may be formed by coating a dry untreated seed I with a self-sustaining shell of colloidal material 2. The shell 2 spaces the successive one or more shells from the seed I and prevents any desired interaction therebetween prior to planting. The surrounding shell 3 may contain a plant food or fertilizing agent incorporated in a colloid while the shell 3 may be formed of an insecticidal agent incorporated in a colloid.

One specific example of the invention especially suitable for the larger seeds is a seed coated with a layer of plain gelatin on the outside of which are successive layers. One could include gelatin and a nitrogen solution such as that known commercially as "Nitrogene," this solution including inoculating bacteria. The next layer could include a plant food or fertilizer such as marl silt mixed in gelatin. A third could include an insecticide such as a weak solution of creosote in water and gelatin. The first layer of clear gelatin could be dispensed with whenever the substance which would then be adjacent the seed would be harmless to the seed as in the above specific example.

Another specific example which is especially suitable for small seeds is a gelatin flake such as a small piece cut from a sheet of gelatin having a seed embedded therein and having successive rings embedded in the gelatin around the seed and preferably spaced threfrom, said rings including the same three substances mentioned in the preceding paragraph. It should be remembered of course that these substances are merely typical examples and that any other suitable substances may be used.

I claim:

1. The combination of a self-sustaining shell of colloidal material, a seed embedded therein and a plurality of different substances for facilitating the growth of the seed when planted carried by said shell, each in one of a plurality of shells enclosing the seed and separated therefrom.

2. A seed carrier comprising a self-sustaining shell of colloidal material having successive shells of different substances for facilitating the growth of the seed when planted and having said first shell free from said substances and adapted for carrying the seed.

3. The combination of a small independent shell of inert dry colloidal binding material, a dry seed in its natural state therein, and small amounts of a plant food, an inoculating material and an insecticide formed in colloidal shells enclosing said first shell and separated from the seed thereby.

ALBERT C. FISCHER.